(12) United States Patent
Townsend, Jr.

(10) Patent No.: US 8,985,535 B1
(45) Date of Patent: Mar. 24, 2015

(54) WIND RESILIENT MAST ARM MOUNTING ASSEMBLY

(71) Applicant: Robert E. Townsend, Jr., Lake Wales, FL (US)

(72) Inventor: Robert E. Townsend, Jr., Lake Wales, FL (US)

( * ) Notice: Subject to any disclaimer, the term of this patent is extended or adjusted under 35 U.S.C. 154(b) by 0 days.

(21) Appl. No.: 14/496,668

(22) Filed: Sep. 25, 2014

Related U.S. Application Data (60) Provisional application No. 62/009,258, filed on Jun. 8, 2014.

(51) Int. Cl.
| | | |
|---|---|---|
| *A47B 96/06* | (2006.01) | |
| *A47G 29/00* | (2006.01) | |
| *A47K 1/00* | (2006.01) | |
| *E04G 3/00* | (2006.01) | |
| *E04G 5/06* | (2006.01) | |
| *F21V 21/00* | (2006.01) | |
| *F21V 35/00* | (2006.01) | |
| *F16M 13/02* | (2006.01) | |
| *G08G 1/095* | (2006.01) | |
| *F16B 2/00* | (2006.01) | |
| *F16B 2/02* | (2006.01) | |

(52) U.S. Cl.
CPC .............. *F16M 13/02* (2013.01); *G08G 1/095* (2013.01); *F16B 2/00* (2013.01); *F16B 2/02* (2013.01)
USPC ........................................................ 248/214

(58) Field of Classification Search
CPC ............. G08G 1/095; F16B 2/00; F16B 2/08; F16B 2/06; F16B 2/02; F16M 13/02
USPC ................... 248/317, 323, 214, 219.4, 230.8, 248/292.14
See application file for complete search history.

(56) References Cited

U.S. PATENT DOCUMENTS

| | | |
|---|---|---|
| 1,985,951 A | 1/1935 | Richterkessing |
| 2,038,117 A | 4/1936 | Layton |
| 2,195,041 A | 3/1940 | Von Schlippe |
| 2,942,366 A | 6/1960 | Pfaff, Jr. et al. |
| 3,033,318 A | 5/1962 | Jewell |
| 3,142,501 A | 7/1964 | Clark et al. |
| 3,612,222 A | 10/1971 | Minor |
| 3,888,446 A | 6/1975 | O'Brien et al. |
| 3,891,175 A | 6/1975 | Hawley et al. |
| 3,977,641 A | 8/1976 | Garchinsky |
| 4,010,925 A | 3/1977 | Garchinsky |
| 4,167,033 A | 9/1979 | Fletcher |

(Continued)

FOREIGN PATENT DOCUMENTS

EP    2 653 072 A2    10/2013

*Primary Examiner* — Amy Sterling
(74) *Attorney, Agent, or Firm* — Brinks Gilson & Lione (57) ABSTRACT

An attachment assembly and a method of mounting a traffic control device to a mast arm are provided. The assembly includes a first attachment device having a first surface and a second surface opposite the first surface and a second attachment device having a first surface and a second surface. The second attachment device is operably connectable to the first attachment device so that the first surface of the first attachment device and the second surface of the second attachment device face each other and are spaced apart from each other. The attachment assembly also includes a cable operably connected the second attachment device and connectable to the mast arm so that the first surface of the second attachment device faces the mast arm and a portion of the cable is positionable between the first surface of the first attachment device and the second surface of the second attachment device.

27 Claims, 6 Drawing Sheets

(56) References Cited

U.S. PATENT DOCUMENTS

| | | |
|---|---|---|
| 4,659,046 A | 4/1987 | Parduhn |
| 4,860,985 A | 8/1989 | Olson et al. |
| 4,917,338 A * | 4/1990 | Olson et al. ............. 248/229.17 |
| 5,340,069 A | 8/1994 | Niemeyer |
| 5,645,255 A | 7/1997 | Parduhn |
| 6,357,709 B1 | 3/2002 | Parduhn |
| 7,997,546 B1 | 8/2011 | Andersen et al. |
| 2011/0193277 A1 | 8/2011 | Christenson |
| 2012/0040498 A1 | 2/2012 | Youn et al. |

* cited by examiner

WIND RESILIENT MAST ARM MOUNTING ASSEMBLY

RELATED APPLICATIONS

This application claims the benefit of the filing date under 35 U.S.C. §119(e) of Provisional U.S. Patent Application Ser. No. 62/009,258, filed Jun. 8, 2014, which is hereby incorporated by reference.

FIELD OF THE INVENTION

The present invention relates generally to the field of traffic control devices and in particular to mast arm support structures and traffic control devices each susceptible to dynamic wind loads that may damage the connection between the horizontal and vertical mast arm support structure and between the traffic control device and the mast arm and to flexible mounting assemblies for mounting traffic control devices to mast arms,

BACKGROUND

Roadway intersections, when warranted, require signalization to maintain safety and efficient movement of vehicular traffic. Traffic control devices (signals, signs, cameras, etc.) are generally supported on roadside posts, suspended from span wires or rigidly mounted on steel mast arms cantilevered over the roadway from a vertical pole that is designed as a rigid structure.

The current designs for supporting traffic signal structures use a rigid connection including drilled and tapped cast aluminum connections to connect the traffic signal to the mast arm. Common prior art cable securements rely on single in-plane surface plate to cable pressures and non-consistent, unpredictable use of acute cable angles.

What is needed in the art is an attachment device and an attachment assembly for connecting a traffic control device to a mast arm that provides a flexible connection for connecting the traffic control device to the mast arm. In some aspects, using cables to secure the traffic control device to the mast arm, an assembly including multiplane surface-cable pressures and that provides for consistent use of acute cable angles is needed.

BRIEF SUMMARY

It is an object of the present invention to provide a device and a method having features that resolve or improve on rigid connection devices connecting traffic control devices to mast arms.

In one aspect, an attachment assembly for mounting a traffic control device to a mast arm is provided. The assembly includes a first attachment device having a first surface and a second surface opposite the first surface and a second attachment device having a first surface and a second surface opposite the first surface. The second attachment device is operably connectable to the first attachment device so that the first surface of the first attachment device and the second surface of the second attachment device face each other and are spaced apart from each other. The assembly also includes a cable operably connected to the second attachment device and connectable to the mast arm so that the first surface of the second attachment device faces the mast arm and a portion of the cable is positionable between the first surface of the first attachment device and the second surface of the second attachment device.

In another aspect, a method of mounting a traffic control device to a mast arm is provided. The method includes connecting an end portion of a cable to a second attachment device, forming a loop from a portion of the cable and positioning the second attachment device on the mast arm. The method further includes positioning the loop over the mast arm and hooking the loop around connectors connected to the second attachment device. The method also includes positioning the cable between the second attachment device and a first attachment device and tightening the cable to secure the second attachment device to the mast arm.

Advantages of the present disclosure will become more apparent to those skilled in the art from the following description of embodiments that have been shown and described by way of illustration. The invention is capable of other and different embodiments, and its details are capable of modification in various respects. Accordingly, the drawings and description are to be regarded as illustrative in nature and not as restrictive.

DETAILED DESCRIPTION

The invention is described with reference to the drawings in which like elements are referred to by like numerals. The relationship and functioning of the various elements of this invention are better understood by the following detailed description. However, the embodiments of this invention are not limited to the embodiments illustrated in the drawings. It should be understood that the drawings are not to scale, and in certain instances details have been omitted which are not necessary for an understanding of the present invention, such as conventional fabrication and assembly.

In some aspects, the present invention is directed to the improvement of common mast arm rigid traffic control device mounting assemblies that provide a rigid connection between a traffic control device and a mast arm. The present invention addresses the known structural deficiencies of the prior art by providing a flexible mast arm saddle and/or flexible swivel type connection device that is approximately 3-5 times stronger, and not susceptible to cracking due to either wind loading and/or installer failure to torque properly. In addition, the present invention provides a much stronger shear-type connection using through bolting to connect the traffic control device to the mast arm.

Rigidity is the property of a structure that it does not bend or flex under an applied force. The opposite of rigidity is flexibility. In structural rigidity theory, structures are formed by collections of objects that are themselves rigid bodies. A structure is rigid if it cannot flex; that is, if there is no continuous motion of the structure that preserves the shape of its rigid components and the pattern of their connections then the structure becomes susceptible to forces placed upon the structure such as wind induced accelerations.

It is a basic engineering design principle that, if possible, a structure must have features that allow for flexibility, while still maintaining its structural loading requirements such as gravitational and wind induced accelerations. The present invention utilizes the "Flexible Moment Connection", semi-rigid approach. The basic principles of the FMC approach are to treat the beams (saddle & swivel) as simply connected under gravity loads but as moment connected under lateral (wind) loads. The FMC can be basically described as three types of connections: One that exhibits a small amount of rotation with a large amount of moment is noted as a rigid connection (prior art). A second connection that exhibits a large amount of rotation with a small amount of moment is noted as simple. The third connection is noted as a semi-rigid connection and provides some moment restraint while permitting some rotation (present invention). Semi-rigid connections can fall anywhere between simple and rigid. In general, connections capable of resisting at least 90 percent of the beam fixed-end moment are referred to as rigid. Those that offer enough ductility to accommodate beam end rotation while resisting no more than 20 percent of the fixed-end moment are referred to as simple. Any connection that is capable of resisting a moment between these limits while permitting some rotation must be treated as semi-rigid or flexible.

When a lateral load (wind) is applied to a mast arm structure, the windward connection of both the mast arm saddle, the swivel plate and the traffic signal will load in a flexural response in the present invention, therefore resulting in a significant increased wind resistance over the prior arts common rigid saddle, swivel plate, and traffic signal support tubes that have very limited, if any, resiliency. It is better for any structure to have less stress due to elasticity than having to absorb any amount of wind force or wind induced kinetic energy.

Cantilevered mast arms are susceptible to four types of wind loading that may induce vibrations that can lead to fatigue failures such as vortex shedding, galloping, natural, wind gust and truck-induced wind gust failures.

In another aspect, the present invention avoids galvanic corrosion risk, especially in wet, salty coastal areas with the aluminum and stainless steel in contact with one another, typical to all prior art aluminum castings that are secured with stainless steel fasteners and more importantly stainless steel cables used to secure the entire traffic control device to the mast arm support. In order for galvanic corrosion to occur, three elements are required: 1) Two metals with different corrosion potentials; 2) Direct metal-to-metal electrical contact; and 3) A conductive electrolyte solution (e.g., moisture) must connect the two metals on a regular basis. The electrolyte solution creates a "conductive path" such as when there is regular immersion, condensation, rain, fog exposure or other sources of moisture that dampen and connect the two metals.

In some embodiments, the attachment assembly of the present invention provides a wind resilient and hurricane resistant traffic signal mounting device by providing a much stronger connection to a cantilevered mast arm.

In some embodiments, the attachment assembly of the present invention is directed to improving the survival of mast arm signalization during high wind events by resisting and minimizing the structural failures (cracked castings) known to occur in current—typical rigid cast aluminum traffic signal mounting bracket assemblies.

In some embodiments, the attachment assembly of the present invention provides additional strength (bending moments) by relocating the tube tensioning connections longitudinally further apart therefore providing an improved fulcrum spacing. In some embodiments, the attachment assembly of the present invention provides compatibility to any current signal head support tube with bracket arms commonly used to hang the traffic control device.

Figure 1:
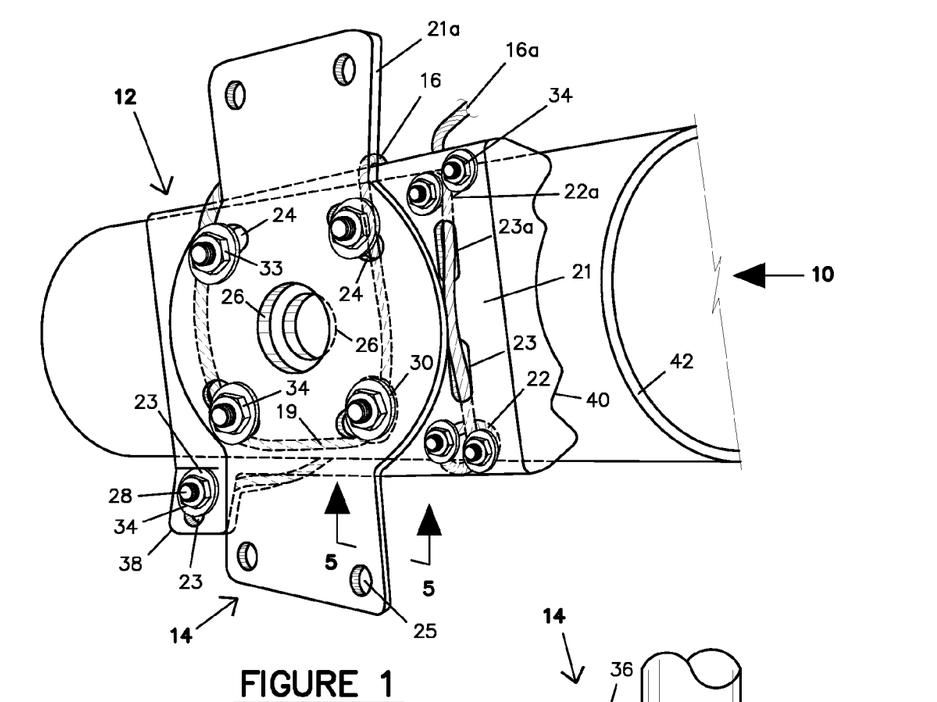
FIG. 1 is a right hand view illustration an embodiment of a mast arm saddle and swivel plate of an attachment assembly in accordance with the present invention.

FIG. 1 represents a right side perspective of an embodiment of an attachment assembly 10 for connecting a traffic control device to a mast arm 42 of a traffic signal support structure. The attachment assembly 10 includes a mast arm saddle or plate 12 and a swivel plate 14. The mast arm saddle 12 and the swivel plate 14 may be provided so that when the assembly 10 is connected to the mast arm 42, one or both of the mast arm saddle 12 and the swivel plate 14 are flexible. A cable 16 operably connects the mast arm saddle 12 to the mast arm 42. A plurality of connectors connects the attachment assembly 10 together as described in more detail below.

In some embodiments, both the mast arm saddle 12 and the swivel plate 14 may be fabricated out of metal, for example, a weather resistant stainless steel plate in a thickness ranging from $\frac{1}{8}$" to $\frac{5}{16}$ pending upon design criteria based upon different wind zones. Other materials such as flexible engineered plastics may also be desirable in some applications. In some embodiments, combinations of materials may be used. The mast arm saddle 12 and the swivel plate 14 may be fabricated using computer controlled (CNC), laser or water jet cutting. Other methods known to one skilled in the art may also be used to fabricate the mast arm saddle 12 and the swivel plate 14, including, but not limited to stamp and punch pressing. In some embodiments, the mast arm saddle 12 may be first cut out as a flat plate with a plurality of apertures. The apertures may include one or more adjustment slots 23 and a plurality of apertures 25 for receiving fasteners therethrough for connecting the mast arm saddle 12 to the swivel plate 14 (further explained below). The cable 16 may also be threaded through some of the apertures. The mast arm saddle 12 may also include an opening 26 that is sized and shaped to receive wires for electrical connections for the traffic control device.

After cutting the mast arm saddle 12 from the flat plate, one or more mast arm engagement flanges 40 may be cold bent approximately 90° downward from a first surface 13 of the saddle 12. In some embodiments, the engagement flanges 40 may be positioned at opposite ends 19 of the saddle 12. Ends 41 of the engagement flanges 40 may each include a curved portion that is adapted to contact a curved portion of the mast arm 42 when the mast arm saddle 12 is positioned on the mast arm 42, for example, when the mast arm 42 is curved. The ends 41 of the engagement flanges 40 may be configured to have any shape that conforms to the shape of the mast arm 42. In some embodiments, the ends 41 may be angular or straight. As shown in FIG. 4, the ends 41 of the engagement flanges 40 contact the mast arm 42 and the first surface 13 of the mast arm saddle 12 faces the mast arm 42. The first surface 13 of the mast arm saddle 12 is spaced apart from the mast arm 42 such that a gap 65 exists between the mast arm saddle 12 and the mast arm 42 to accommodate flexing of the mast arm saddle 12. In some embodiments, the engagement flange 40 may be positioned other than at the opposite ends 19 of the mast arm saddle 12. By way of non-limiting example, one or more engagement flanges 40 may be positioned away from the ends 19 of the mast arm saddle 12 at a central position or offset from the center. Additionally, in some embodiments, an acute angle connection flange 38 may be cold bent approximately 10° to 20° upward from a second surface 15 of the saddle 12 pending final design criteria as shown in FIGS. 1, 3A and 3B.

Figure 3A:
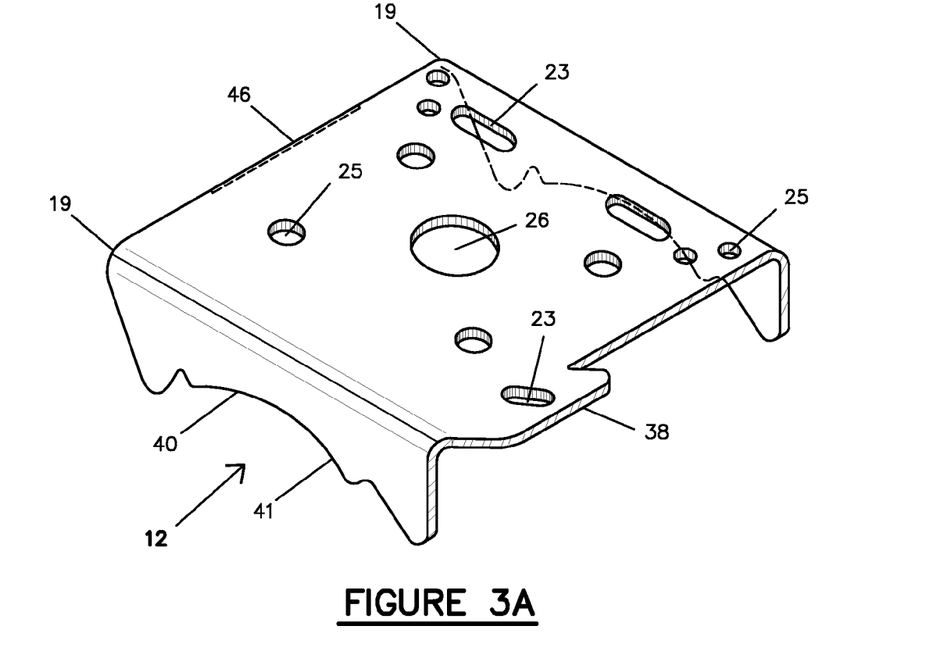
FIG. 3A is an isometric view taken from one end of the mast arm saddle shown in FIG. 1.
Figure 3B:
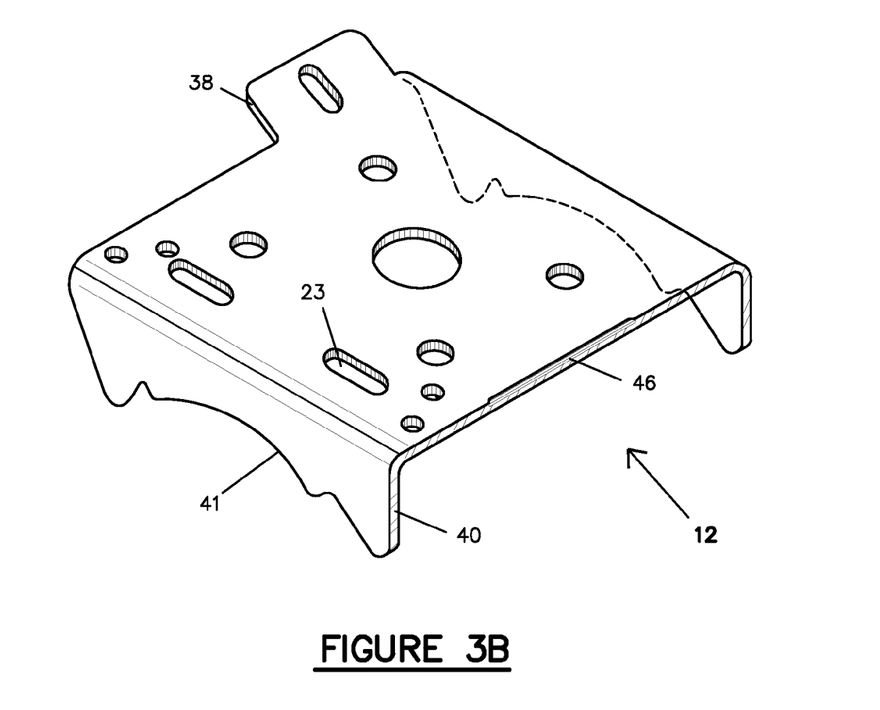
FIG. 3B is also an isometric view of the opposite end of the mast arm saddle shown in FIG. 3A.
Figure 4:
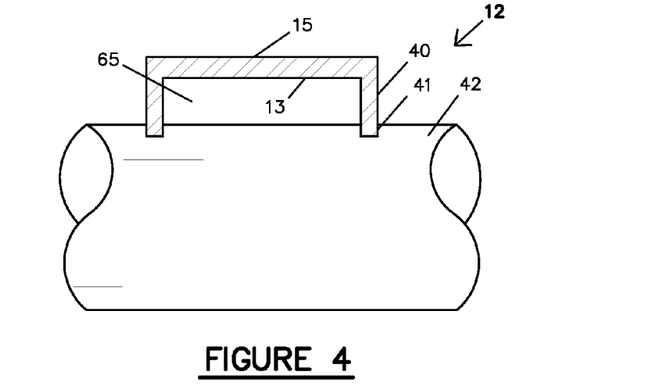
FIG. 4 is a side view of a mast arm saddle and a mast arm.

FIGS. 3A and 3B are isometric views showing the mast arm saddle 12 for reference without any attachments. Both FIGS. 3A and 3B generally illustrate the saddle 12 post cutting and bending. Eased-rounded edges 46 are shown and may be provided to prevent any fraying or shear points of the cable 16. In some embodiments, the mast arm saddle may include a "turned down" longitudinal flange (not shown) to utilize a thinner saddle material. The longitudinal turned down flange is free from contact with the mast arm.

The swivel plate 14 may be similarly fabricated (laser cut) from a flat plate. The swivel plate 14 may include one or more arcuate slots 24 for receiving fasteners therethrough for connecting the mast arm saddle 12 to the swivel plate 14. The swivel plate 14 may also include an opening 26 that is sized and shaped to receive wires for electrical connections for the traffic control device. The opening 26 in the mast arm saddle 12 and the opening 26 in the swivel plate 14 may be aligned to facilitate passage of the electrical connections therethrough.

Figure 2:
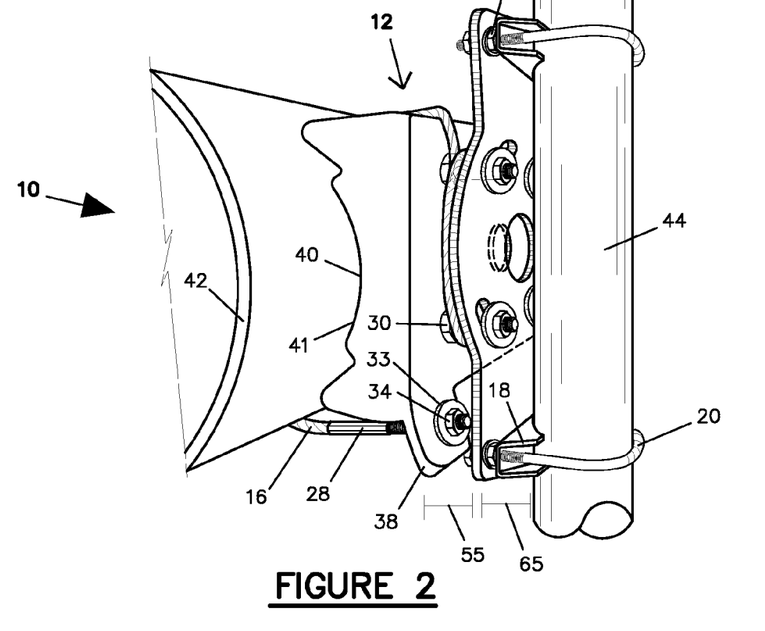
FIG. 2 is a left hand view illustration of an embodiment of a mast arm saddle and swivel plate of an attachment assembly and a sectional portion of a standard traffic signal support tube.

The swivel plate 14 is shown for reference attached to saddle 12 in FIG. 1 without the traffic signal tube as depicted and more fully described in FIG. 2. As shown in FIG. 1, the swivel plate 14 may include four arcuate slots 24 that receive bolts 32 and inverted flange nuts 30 (phantom). Vertical and in some installations horizontal mounting is possible by utilizing slots 24 to adjust the swivel plate 14 in order to achieve the required plumbness (vertical applications) or level (horizontal applications), HG, 6 is a plan view showing the swivel plate 14 without any attachments. In the embodiment shown in Ha 6, an expansion area 14a may be included in some embodiments for additional flexibility of the swivel plate 14. The wire access opening 26 and the arcuate slots 24 are also shown. Fastening apertures 25 may be used for securing the swivel plate 14 to a signal securing tube 44 using utility U-bolts 20 (shown in Ha 2) or flexible signal brackets 17 (shown in FIGS. 7 and 8).

Figure 5:
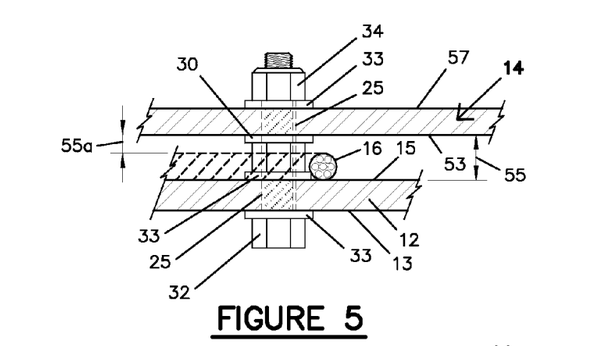
FIG. 5 is a cross sectional view taken along 5 of FIG. 1.
Figure 6:
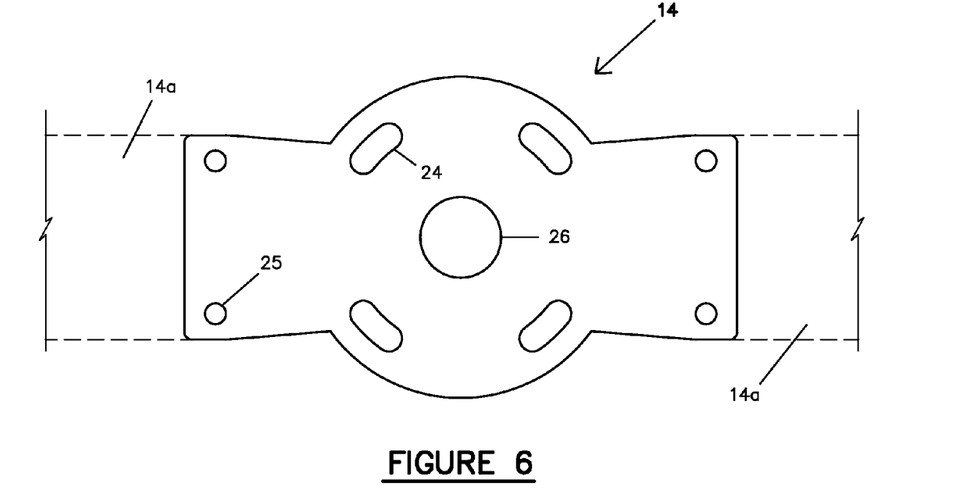
FIG. 6 is a plan view of an embodiment of a swivel plate.

FIG. 5 is a cross sectional view taken along 5 of FIG. 1. For reference, a portion of the mast arm saddle 12 and swivel plate 14 is shown with an exemplary connection. By way of non-limiting example, an inverted flange nut 30 may be installed over washer 33 secured to the mast arm saddle 12. In some embodiments, washers, bushings, coupling nuts or other fasteners may also be used. The purpose of inverting the flange nut 30 is dual functioning; first to allow the mast arm saddle 12 and the swivel plate 14 to move relative to one another by the separation of the second surface 15 of the mast arm saddle 12 from a first surface 53 of the swivel plate 14, creating a displacement gap 55. The term "displacement" as used herein is defined as the distance of a flexible body from its equilibrium. In some embodiments, it may be preferable to increase a length of a gap 55a to provide additional displacement and/or clearance of the cable 16. In contrast to the typical prior art connections where the saddle and plate faces are typically closely positioned adjacent to each other for rigidity with no space therebetween, the flange nut 30 and washer 33 positioned between the mast arm saddle 12 and the swivel plate 14 create the displacement gap 55 at each moment connection area that allow one or both the mast arm saddle 12 and swivel plate 14 to flex independent from each other. The second function is to capture the cable 16 temporarily while pre-tensioning as described with reference to installation of the attachment assembly 10. The final securement of the swivel plate 14 will prevent release of a cable loop 19.

Figures 7, 9:
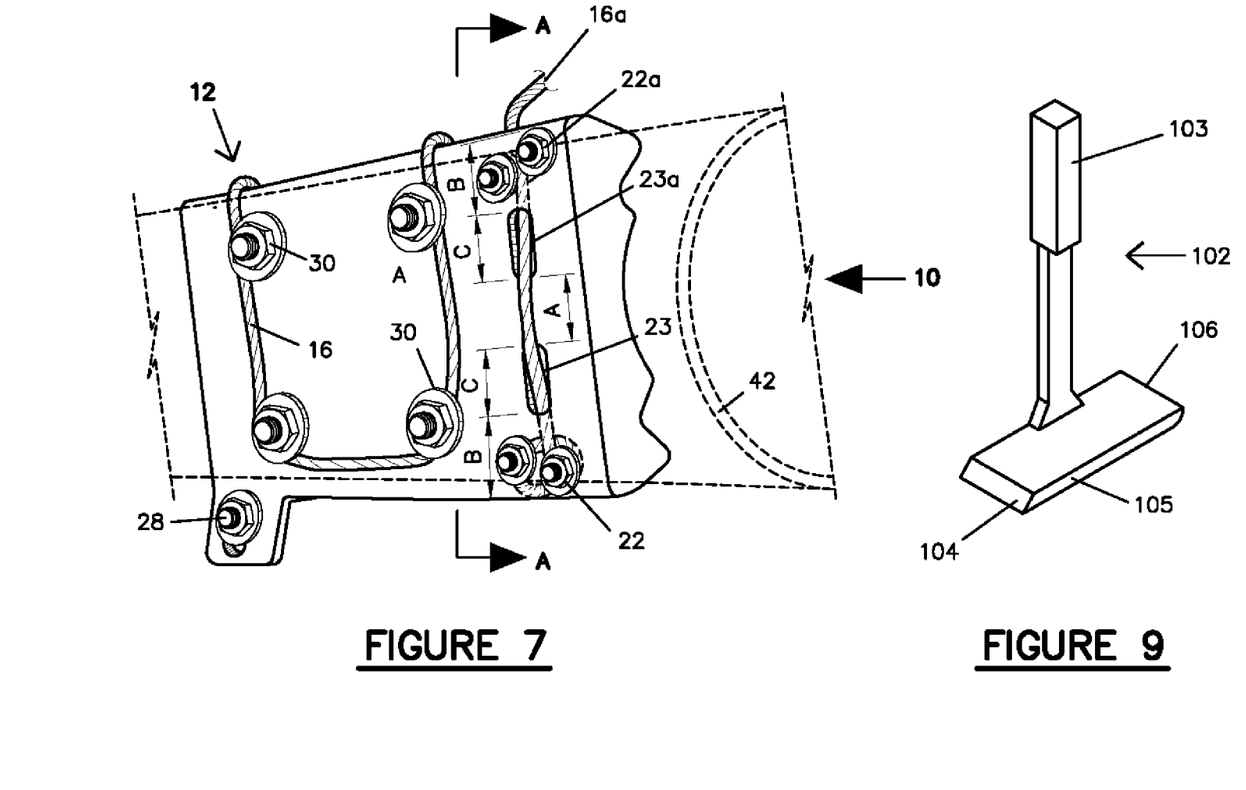
FIG. 7 is an isometric view of an embodiment of a mast arm saddle.
FIG. 9 is an embodiment of a tool that may be used to apply tension to the attachment assembly.

FIGS. 2 and 7 illustrate the mast arm saddle 12 shown connected to the mast arm 42 with the curved surface 41 of the engagement flange 40 positioned against the mast arm 42. FIG. 2 illustrates a conventional signal support tube 44 connected to flexible the swivel plate 14 without the traffic control device for clarity. FIG. 2 depicts a portional side view of the attachment assembly 10 showing the displacement gap 55 between the mast arm saddle 12 and the swivel plate 14. FIG. 2 also illustrates a gap 65 between the swivel plate and the support tube 44. For reference, the signal support tube 44 is sometimes channeled and in most instances gusseted for added strength—both common and typical to mast arm traffic signal mounting hardware. The tube 44 generally includes a bottom bracket and a top bracket with a traffic control device between the two brackets (see FIG. 11). In some embodiments, it may be preferable to replace the rigid tube and cast aluminum brackets with flexible rectangular stainless steel signal bracket.

Final electrical connections are made utilizing conductors 52 into terminal housing 50 through waterproof grommet 51 to connection block (not shown) located in terminal housing 50. Embodiments of the attachment assembly 10 are also adaptable to be used with common tube, brackets, traffic control device and a means to provide wire access.

Figure 11:
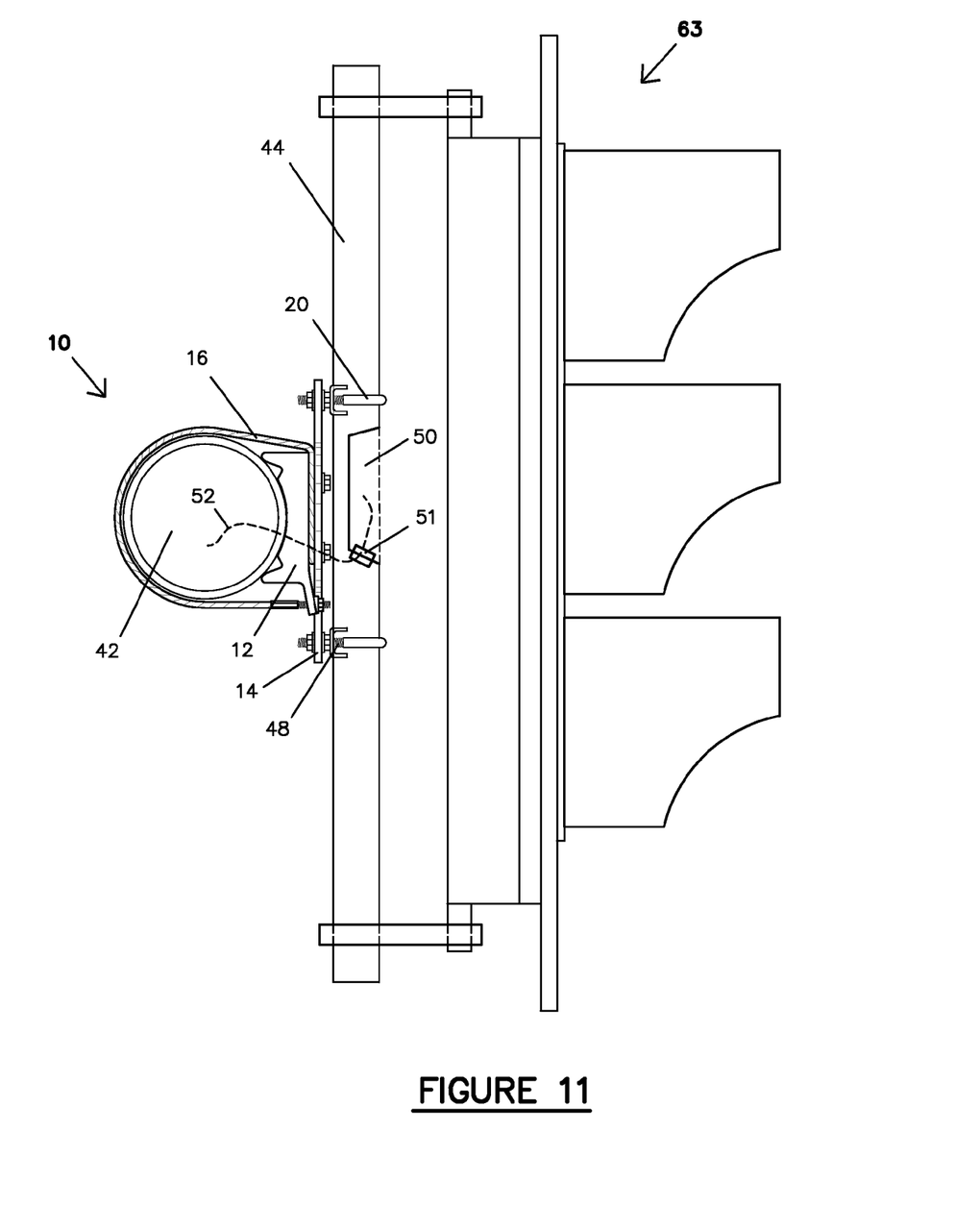
FIG. 11 is a side view of an embodiment of a mast arm saddle and a swivel plate with a single unit traffic signal mounted thereto.

The embodiments, for example as shown in FIGS. 2 and 11, take into account the mass of the bracket(s), tube 44 and traffic control device as it relates to gravitational and wind loading in respect to acceleration and deceleration forces upon the saddle plate 12 and swivel plate 14. The flexibility and the resiliency of the attachment assembly 10 are a function of the mass of the traffic control device, the length of the swivel plate and/or the signal bracket, the thickness of the swivel plate and/or the signal bracket, the width of the mast arm saddle and the thickness of the mast arm saddle. The amount of flexibility is determined by the material thickness and the amount of lateral clearance in the gap 65 between the second face 57 of the swivel plate 14 and the tube 44. The gap 65 is created by either a saddle 18 against the support tube 44 and/or stand off nuts 36 and is directly proportional to the overall length of the swivel plate 14. The tube 44 is secured to swivel plate 14 utilizing U-bolts 20 around the tube 44, through the saddle 18 and connected with appropriate fasteners.

An exemplary method for installing the attachment assembly 10 is described. One skilled in the art will recognize that other methods may also be used, including, but not limited to, metal bands or bent to fit bolts. Prior to installation on the mast arm 42, a swedge bolt 28 connected to the cable 16 is inserted into the adjustment slot 23 of the angle connection flange 38 of the mast arm saddle 12 and is temporarily attached utilizing washer 33 and nut 34. The connection flange 38 of the mast arm saddle 12 has an upward acute plane to lessen cable stress from different diameter mast arms. It is important at this stage to just start nut 34 preferably less than full nut thread length so as to be able, upon tensioning, achieve the greater amount of tensioning range. The free end of the cable 16 is inserted through a cable clamp 22 connected to the mast arm saddle 12, then threaded upward through the slot 23 over the second surface 15 of the saddle 12 to the slot 23a then through the slot 23a downward continuing along the first surface 13 of the mast arm saddle 12 and outward and through a clamp 22a. At this stage the cable 16 now has a loop 19 which is temporarily secured to the attachment assembly 10. Prior to securing to the attachment assembly 10 utilizing inverted flange nuts 30 as shown in FIG. 1, the saddle 12 is placed temporarily on top of mast arm 42 utilizing the engagement flanges 40. The loop 19 is brought up over the mast arm 42 and hooked around inverted flange nuts 30, see also FIG. 5. Slack in the cable 16 may then be removed by hand pulling of the cable end 16a to pre-tension the cable 16. As shown in FIG. 7, the cable 16 extends a length A along the second surface 15 of the mast arm saddle 12, a length B along the first surface 13 of the mast arm saddle 12 and through slots 23 and 23a in the mast arm saddle 12 having a length C.

Figure 8:
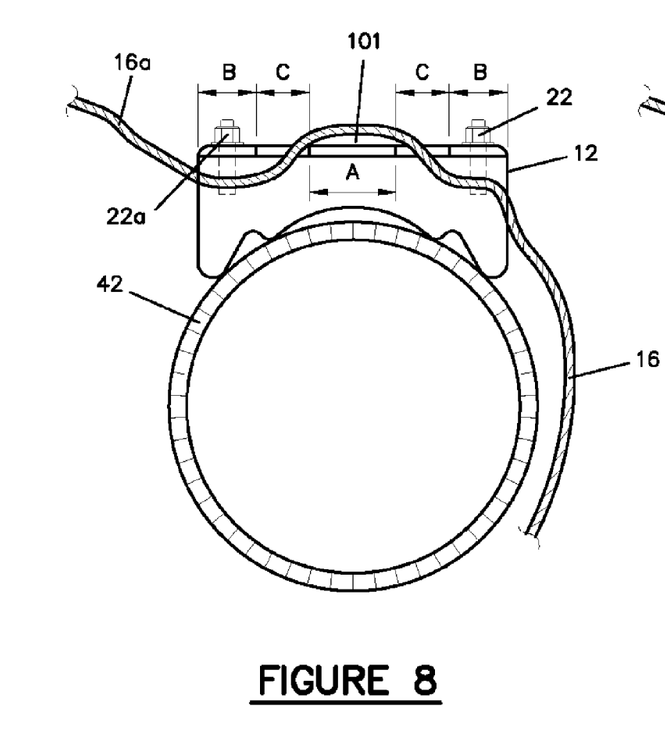
FIG. 8 is a cross section taken along line A-A of FIG. 7.

FIG. 8 illustrates a cross sectional view taken along line of FIG. 7 and showing the mast arm saddle 12 positioned on top of the mast arm 42. A small gap 101 may be provided between the cable 16 and the second surface 15 where the cable 16 extends the length A between the slots 23 and 23a and the cable clamp 22a is temporarily tightened. The cable clamps 22, 22a may include a standard cable saddle depending upon the wind loading at a particular location.

FIG. 9 illustrates a tool 102 that may be used to apply pre-tension between the mast arm saddle 12 and the mast arm 42. The tool 102 includes a handle 103 and a lever plate 105. In some embodiments, the lever plate 105 is integrally formed with the handle 103. The lever plate 105 has a first end 104 having a chisel shape to facilitate placement of the end 104 between the cable 16 and the second surface 15 of the mast arm saddle 12. The lever plate 105 includes a second end 106 that may include a rounded shape that allows for less stress on the cable 16.

Figure 10:
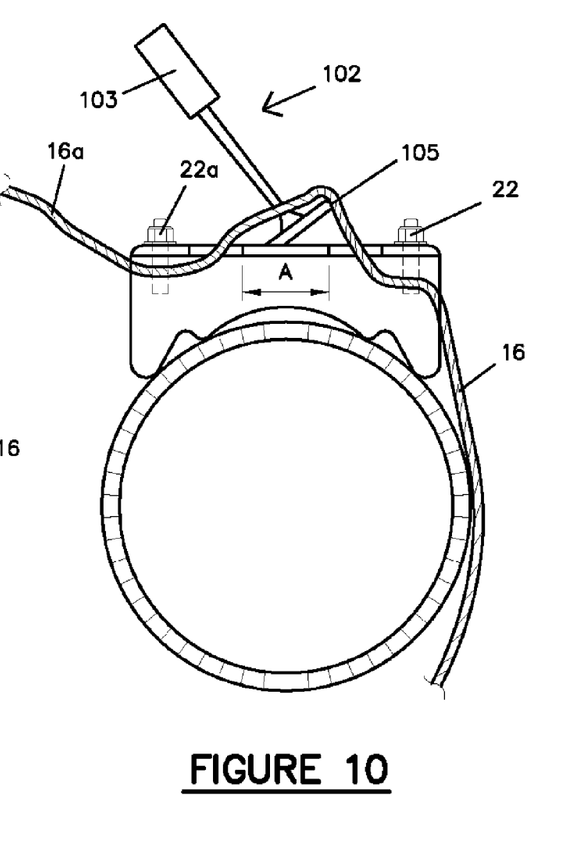
FIG. 10 illustrates an embodiment of the tool applying tension to the attachment assembly.

FIG. 10 illustrates use of the tool 102 with the mast arm assembly 10. As shown, the lever plate 105 of the tool 102 may be inserted into the gap 101 and rotated until cable slack is removed from the cable 16 and a firm tension is applied. While maintaining the tension, cable clamp 22 is tightened. The tool 102 is removed and clamp 22a is loosened. Extra slack is removed by pulling on cable end 16a and then secured by retightening clamp 22a. The mast arm saddle 12 is rotated on the mast arm 42 to the desired vertical plane relative to the roadway below. In some instances, depending on the shape of the mast arm 42, i.e., a 12 sided polygon, it may be difficult to rotate the mast arm saddle 12. By loosening the clamp 22, only the tensioning forces between the tool-leverage and the hand tensioning of the cable slack described above remain and should minimize any difficulty in rotating the mast arm saddle 12. The swedge bolt 28 for the cable 16 is tightened to cinch the mast arm saddle 12 to the mast arm 42.

In some embodiments, the traffic control device 63 is connected to the support tube 44 using the appropriate fasteners. Then the tube 44 is connected to the swivel plate 14 for example using u-bolts 20 connected to saddles 18 as shown in FIG. 11. The swivel plate 14 with the traffic control device 63 connected thereto is connected to the mast arm saddle 12 and the slots 24 of the swivel plate 14 are used to adjust the traffic control device to be level or plumb.

While the embodiments here in have been described with reference to use with a mast arm system, the embodiments may also be used with lighting poles and other structures, such as street lighting and high mast interstate lighting systems. The embodiments described herein may also be used with signs.

The above Figures and disclosure are intended to be illustrative and not exhaustive. This description will suggest many variations and alternatives to one of ordinary skill in the art. All such variations and alternatives are intended to be encompassed within the scope of the attached claims. Those familiar with the art may recognize other equivalents to the specific embodiments described herein which equivalents are also intended to be encompassed by the attached claims.

The invention claimed is:

1. An attachment assembly for mounting a traffic control device to a mast arm, the assembly comprising:
   a first attachment device having a first surface and a second surface opposite the first surface;
   a second attachment device having a first surface and a second surface opposite the first surface, the second attachment device operably connectable to the first attachment device so that the first surface of the first attachment device and the second surface of the second attachment device face each other and are spaced apart from each other by a distance to define an opening between the first surface of the first attachment device and the second surface of the second attachment device; and
   a cable operably connected to the second attachment device and connectable to the mast arm so that the first surface of the second attachment device faces the mast arm and a first portion of the cable is positionable in the opening between the first surface of the first attachment device the second surface of the second attachment device and a second portion of the cable is positionable along the first surface of the second attachment device between the first surface of the second attachment device and the mast arm and a portion of the opening remains open.

2. The assembly according to claim 1, wherein at least one of the first attachment device or the second attachment device is flexible.

3. The assembly according to claim 1, wherein one of the first attachment device or the second attachment device is rigid.

4. An attachment assembly for mounting a traffic control device to a mast arm, the assembly comprising:
   a first attachment device having a first surface and a second surface opposite the first surface;
   a second attachment device having a first surface and a second surface opposite the first surface, the second attachment device operably connectable to the first attachment device so that the first surface of the first attachment device and the second surface of the second attachment device face each other and are spaced apart from each other; and
   a cable operably connected to the second attachment device and connectable to the mast arm so that the first surface of the second attachment device faces the mast arm and a portion of the cable is positionable between the first surface of the first attachment device and the second surface of the second attachment device;
   wherein the first surface of the second attachment device is spaced apart from the mast arm.

5. The assembly according to claim 1, wherein the second attachment device comprises an engagement flange extending away from the first surface of the second attachment device, the engagement flange having a surface adapted to contact the mast arm.

6. The assembly according to claim 1, wherein the second attachment device comprises a first engagement flange and a second engagement flange extending away from the first surface of the second attachment device, the first engagement flange and the second engagement flange each having a surface adapted to contact the mast arm.

7. The assembly according to claim 6, wherein the first engagement flange extends from a first end of the second attachment device and the second engagement flange extends from a second end of the second attachment device.

8. An attachment assembly for mounting a traffic control device to a mast arm, the assembly comprising:
a first attachment device having a first surface and a second surface opposite the first surface;
a second attachment device having a first surface and a second surface opposite the first surface, the second attachment device operably connectable to the first attachment device so that the first surface of the first attachment device and the second surface of the second attachment device face each other and are spaced apart from each other; and
a cable operably connected to the second attachment device and connectable to the mast arm so that the first surface of the second attachment device faces the mast arm and a portion of the cable is positionable between the first surface of the first attachment device and the second surface of the second attachment device;
wherein the second attachment device is generally rectangularly shaped and the second attachment device is positioned so that a long edge of the rectangularly shaped second attachment device extends generally parallel to a longitudinal axis of the mast arm; and,
wherein the second attachment device comprises a flange extending along at least a portion of the long edge and free from contact with the mast arm.

9. The assembly according to claim 1, wherein the second attachment device comprises a plurality of apertures therethrough, at least one of the apertures being adapted to receive the cable therethrough.

10. The assembly according to claim 1, wherein the second attachment device comprises an angled connection flange extending away from the mast arm.

11. The assembly according to claim 1, wherein the first attachment device comprises a plurality of arcuate openings.

12. The assembly according to claim 1, wherein at least one of the first attachment device and the second attachment device comprise stainless steel.

13. The assembly according to claim 1, wherein a plurality of connectors connect the first attachment device to the second attachment device, the plurality of connectors adapted to provide a gap between the first attachment device and the second attachment device.

14. The assembly according to claim 13, wherein each of the plurality of connectors comprises an inverted flange nut positioned between the first attachment device and the second attachment device.

15. The assembly according to claim 1, wherein a single unit signal housing is operably connected to the first attachment device.

16. The assembly according to claim 1, wherein the cable is threaded upward through a first clamp and upward through a slot in the second attachment device and over a second surface of the second attachment device to a second slot and through the second slot along the first surface of the second attachment device and through the slot downward continuing along the first surface of the second attachment device and through a second clamp.

17. The assembly according to claim 4, wherein at least one of the first attachment device or the second attachment device is flexible.

18. The assembly according to claim 4, wherein one of the first attachment device or the second attachment device is rigid.

19. The assembly according to claim 4, wherein the second attachment device comprises an engagement flange extending away from the first surface of the second attachment device, the engagement flange having a surface adapted to contact the mast arm.

20. The assembly according to claim 4, wherein the second attachment device comprises a first engagement flange and a second engagement flange extending away from the first surface of the second attachment device, the first engagement flange and the second engagement flange each having a surface adapted to contact the mast arm.

21. The assembly according to claim 20, wherein the first engagement flange extends from a first end of the second attachment device and the second engagement flange extends from a second end of the second attachment device.

22. The assembly according to claim 4, wherein the second attachment device is generally rectangularly shaped and the second attachment device is positioned so that a long edge of the rectangularly shaped second attachment device extends generally parallel to a longitudinal axis of the mast arm.

23. The assembly according to claim 4, wherein the second attachment device comprises an angled connection flange extending away from the mast arm.

24. The assembly according to claim 4, wherein a plurality of connectors connect the first attachment device to the second attachment device, the plurality of connectors adapted to provide a gap between the first attachment device and the second attachment device.

25. The assembly according to claim 4, wherein each of the plurality of connectors comprises an inverted flange nut positioned between the first attachment device and the second attachment device.

26. The assembly according to claim 8, wherein at least one of the first attachment device or the second attachment device is flexible.

27. The assembly according to claim 8, wherein one of the first attachment device or the second attachment device is rigid.

* * * * *